Patented Apr. 10, 1923.

1,450,982

UNITED STATES PATENT OFFICE.

MELVILLE J. MARSHALL AND GEORGE S. SHAW, OF SHAWINIGAN FALLS, CANADA, ASSIGNORS TO SHAWINIGAN LABORATORIES, LIMITED, OF MONTREAL, QUEBEC, CANADA, A CORPORATION.

PROCESS OF REMOVING DESTRUCTIVE SUBSTANCES FROM NONAQUEOUS MEDIA.

No Drawing.   Application filed September 17, 1920. Serial No. 410,934.

*To all whom it may concern:*

Be it known that we, MELVILLE J. MARSHALL and GEORGE S. SHAW, both subjects of the King of Great Britain, and residents of the town of Shawinigan Falls, in the Province of Quebec and Dominion of Canada, have invented certain new and useful Improvements in Processes of Removing Destructive Substances from Nonaqueous Media, of which the following is a full, clear, and exact description.

This invention relates generally to a method for the removal of acids or other material from non-aqueous or substantially non-aqueous media, and more particularly to improvements in the method of manufacturing and purifying esters and similar bodies.

The invention resides especially in providing a method for the separation of materials which cause decomposition of the main product on heating or on distillation.

For example, in the manufacture of ethylidene diacetate, there remains in the liquor composed largely of ethylidene diacetate, a certain proportion of acids or acid radicals which become active on heating of the liquor to decompose some of the ethylidene diacetate. In this way, it is impossible to distill the ethylidene diacetate for purification purposes without considerable loss. In a similar way, the final treatment or purification of products such as acetal is interfered with or prevented by the presence of acids or acid radicals or other components of the reaction mixture.

Broadly speaking, the object of this invention is attained by adding to the reaction mixture, composed largely of the reaction products, a body which does not combine with or decompose the desired product but which does combine with the acid or other body which it is desired to remove to form a compound inactive in the desired product and preferably insoluble therein, so that it may be readily removed by sedimentation or filtration, or both.

As an example of the process, the application thereof to the manufacture of ethylidene diacetate may be explained in detail. Ethylidene diacetate is manufactured by passing acetylene gas into glacial acetic acid at a temperature of approximately 70° to 80° C. in presence of a catalyst. The catalyst most generally used is a mercury salt, preferably mercuric sulphate. In this process, acetic acid is not entirely converted to ethylidene diacetate but gives as a reaction product a mixture comprising about 70% to 80% ethylidene diacetate and 30% to 20% acetic acid with small amounts of acetaldehyde and other bodies. The mercury salts used as the catalyst are reduced in the process yielding metallic mercury in a precipitated form and sulphuric acid. If distillation is now attempted, it is found that instead of securing ethylidene diacetate and acetic acid that the ethylidene diacetate is itself largely decomposed into acetic acid, acetic anhydride, acetaldehyde and a large amount of resinous products, even when the distillation is carried out in vacuo.

In applying the present invention to the particular process just outlined, the solid ingredients of the reaction liquor are preferably first removed by sedimentation and the liquor then treated with a salt in solution, which salt combines with the acid to be removed and forms a compound, preferably insoluble in ethylidene diacetate and acetic acid. Anhydrous sodium acetate is particularly adapted for the process under discussion since it is readily soluble in the mixed acetic acid and ethylidene diacetate and does not react with either, but combines quickly and readily with sulphuric acid forming a sodium salt which is insoluble in either acetic acid or ethylidene diacetate. This sodium salt precipitates as it forms and may be separated by sedimentation or filtration, leaving a mixture composed chiefly of acetic acid and ethylidene diacetate and free from sulphuric acid. The mixture can now be distilled by the usual methods, either at atmospheric pressure or in vacuo, and separation of the components effected with but very slight decomposition, if any. The removal of acid is represented by the following equation, in which X denotes the acid radical;

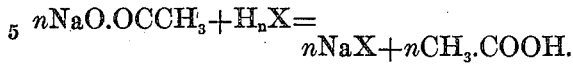

As a further example of the application of this invention, the following is given:—
Acetal may be manufactured from acetylene and anhydrous alcohol by bringing them together in presence of a catalyst. The resulting reaction mixture consists of a mixture of acetal and ethyl alcohol. If mercuric sulphate is used, as the catalyst, it is reduced with the formation of metallic mercury and free sulphuric acid. This acid must be removed before distillation to separate the acetal and alcohol, as otherwise decomposition of the acetal takes place. In order to remove sulphuric acid from this process, sodium ethylate is found satisfactory, as it dissolves in alcohol and does not react with acetal and forms with sulphuric acid a salt which is inactive during the distillation and which may be readily separated from acetal and alcohol according to the following equation;—

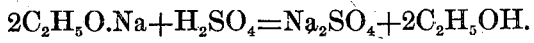

In the foregoing examples, the catalysts referred to are mercury salts and the acid destroying agents referred to are sodium salts, the reason being that these are the most satisfactory for the purpose of the reactions outlined. It will be understood, however, that the invention is not limited to these particular bodies nor to the removal of sulphuric acid, since when producing products other than those specifically mentioned, the catalysts used may be the salts of other metals than mercury produced with mineral acids, not necessarily sulphuric, and the acid liberated may be removed with the salts of metals, not necessarily sodium, such as potassium, calcium, barium or the like. It is to be understood, however, that the invention is not limited in any way to the substances named nor to the manufacture of the products named.

When dealing with esters, which are readily hydrolyzed by the action of water, the acid destroying agent added should be anhydrous or practically anhydrous or should be such that the reactions caused thereby will not result in the liberation of detrimental quantities of water which would cause hydrolysis of the esters.

Having thus described our invention, what we claim is;—

1. In the manufacture of esters, the step of adding to mixed products of reaction containing an ester decomposing acidic substance, a metal salt which combines with the decomposing substance to form a product readily separable from the ester and which does not decompose the ester.

2. In the manufacture of esters which are produced mixed with sulphuric acid, the step of adding a substantially anhydrous salt of an alkali metal which forms with sulphuric acid a salt which does not decompose the esters during purification thereof.

3. A process of separating mineral acids from non-aqueous, organic liquid compound or compounds, which comprises adding to the compound or compounds a body inactive with respect thereto which combines with the mineral acids to form a compound inactive with respect to the organic compound or compounds.

4. A process of separating mineral acids from non-aqueous or practically non-aqueous, organic liquid compounds, which comprises adding to the compounds a body inactive with respect to and soluble in the non-aqueous, organic compound or compounds, which combines with the mineral acids to form a compound inactive with respect to the organic compound or compounds.

5. A process of separating mineral acids from non-aqueous or practically non-aqueous, organic liquid compounds, which comprises adding to the compounds a body inactive with respect to and soluble in the non-aqueous, organic compound or compounds, which combines with the mineral acids to form a compound inactive with respect to the organic compound or compounds and insoluble therein.

6. In a method for the manufacture of ethylidene diacetate, the step of adding to the reaction liquid comprising chiefly ethylidene diacetate, acetic acid and a mineral acid, a body which does not react with the ethylidene diacetate and acetic acid but which combines with the mineral acid and forms a body which does not react with the ethylidene diacetate and acetic acid.

7. In the manufacture of ethylidene diacetate, the step of adding to a mixture of ethylidene diacetate, acetic acid and a mineral acid, a body readily soluble in the ethylidene diacetate and acetic acid mixture, which does not react therewith but which does combine with the mineral acid to form a precipitate insoluble in ethylidene diacetate and acetic acid and which does not react therewith.

8. In the manufacture of ethylidene diacetate, the addition to the reaction liquor, comprising chiefly ethylidene diacetate, acetic acid and a mineral acid, of anhydrous sodium acetate in quantity sufficient to precipitate all the mineral acid, and subsequently separating the ethylidene diacetate from the mixture by distillation.

9. In the manufacture of ethylidene diacetate, the separation of mineral acids therefrom by the addition of anhydrous sodium acetate in quantity sufficient to precipitate all the mineral acid present, and the subsequent removal of the formed body by sedimentation and filtration.

10. In the manufacture of esters by processes yielding acidic bodies mixed with the esters which decompose the esters during purification, the step of adding a metal salt which combines with the ester decomposing body without liberation of water.

11. In the purification of esters mixed with mineral acids, the prevention of hydrolysis and decomposition of the esters by adding a metal salt which combines with the acids without liberation of water to produce compounds inactive with respect to the esters during purification.

12. In the manufacture of ethylidene diacetate, the addition to the reaction liquor comprising chiefly ethylidene diacetate, acetic acid and a mineral acid, of an acetate in quantity sufficient to precipitate all the mineral acid, and subsequently separating ethylidene diacetate from the mixture by distillation.

13. In the manufacture of ethylidene diacetate, the separation of mineral acids therefrom by the addition of an acetate in quantity sufficient to precipitate all the mineral acid present, and the subsequent removal of the formed body by sedimentation.

14. In the manufacture of esters by processes in which a mineral acid remains admixed with the ester and which will decompose the ester during purification, the step of adding a metal salt in quantity sufficient to precipitate all the mineral acid, the said salt being capable of combining with substantially no liberation of water and of producing a compound inactive and insoluble in the ester.

15. In the manufacture of esters by processes yielding the esters admixed with mineral acid which will decompose the ester on purification, the step of adding the salt of a metal and the ester producing acid which will precipitate the mineral acid substantially without liberation of water and as a compound inactive in the ester.

In witness whereof, we have hereunto set our hands.

MELVILLE J. MARSHALL.
GEORGE S. SHAW.